United States Patent
Dobbs

(10) Patent No.: US 10,687,663 B2
(45) Date of Patent: Jun. 23, 2020

(54) TEMPERATURE CONTROLLED CONTAINER

(71) Applicant: Angelica Dobbs, Troy, NY (US)

(72) Inventor: Angelica Dobbs, Troy, NY (US)

( * ) Notice: Subject to any disclaimer, the term of this patent is extended or adjusted under 35 U.S.C. 154(b) by 0 days.

(21) Appl. No.: 15/676,738

(22) Filed: Aug. 14, 2017

(65) Prior Publication Data
US 2019/0082882 A1 Mar. 21, 2019

(51) Int. Cl.
A47J 36/24 (2006.01)
F25D 31/00 (2006.01)
A47J 36/26 (2006.01)
A47J 36/32 (2006.01)

(52) U.S. Cl.
CPC ......... *A47J 36/2483* (2013.01); *A47J 36/26* (2013.01); *A47J 36/321* (2018.08); *F25D 31/005* (2013.01)

(58) Field of Classification Search
CPC ...... A47J 36/2483; A47J 36/321; A47J 36/26; F25D 31/005
USPC ......... 99/276, 331, 451, 467, 468, 470, 472, 99/483, 486, 493, 506, 534, 535, 586.1, 99/289.1
See application file for complete search history.

(56) References Cited

U.S. PATENT DOCUMENTS

| | | | | |
|---|---|---|---|---|
| 4,156,454 A * | 5/1979 | Skala | ................ | A47J 27/17 165/259 |
| 4,823,554 A * | 4/1989 | Trachtenberg | .......... | A47J 36/26 62/239 |
| 5,351,745 A * | 10/1994 | Park | .................. | A23B 7/10 165/263 |
| 5,771,788 A * | 6/1998 | Lee | .................. | A21C 13/00 99/468 |
| 6,263,591 B1 * | 7/2001 | La Porte | .............. | F26B 9/003 219/386 |
| 6,278,098 B1 * | 8/2001 | Han | .................. | F25D 23/12 126/21 A |
| 6,612,115 B2 * | 9/2003 | Luo | .................. | A47J 27/002 62/3.6 |
| 6,658,858 B1 * | 12/2003 | Thompson | .......... | A23B 7/0425 62/3.2 |
| 6,763,665 B2 * | 7/2004 | Clark | ................. | A23B 4/066 62/3.2 |
| 7,174,720 B2 * | 2/2007 | Kennedy | ............. | A47J 27/004 62/3.3 |
| 7,347,139 B2 * | 3/2008 | Cheung | ............... | B03C 3/38 99/467 |
| 7,872,214 B2 * | 1/2011 | Schandel | ............. | A47J 27/004 219/385 |
| 8,555,656 B2 * | 10/2013 | Al-Qaffas | ............ | F25B 21/04 220/592.17 |
| 9,267,723 B2 * | 2/2016 | Alfille | ................ | A47G 19/26 |
| 9,976,750 B1 * | 5/2018 | Kestner | .............. | A47J 36/2483 |
| 9,980,322 B1 * | 5/2018 | Kestner | .............. | A47J 36/2488 |
| 9,995,529 B1 * | 6/2018 | Banks | ................. | F25D 31/005 |
| 10,107,547 B1 * | 10/2018 | Kraminer | ............ | F25D 31/007 |
| 10,188,229 B2 * | 1/2019 | Alexander | .......... | A47G 19/027 |

(Continued)

*Primary Examiner* — Jimmy Chou
(74) *Attorney, Agent, or Firm* — Garrett James O'Sullivan

(57) ABSTRACT

A temperature controlled container comprises an interior defined by a bottom surface and one or more sidewalls extending upward therefrom. A temperature controlling element is configured to adjust a temperature within the interior. A controller is configured to adjust the temperature within the interior.

9 Claims, 2 Drawing Sheets

(56) References Cited

U.S. PATENT DOCUMENTS

| | | | |
|---|---|---|---|
| 2006/0005548 A1* | 1/2006 | Ruckstuhl | A47B 77/08 62/3.2 |
| 2007/0180839 A1* | 8/2007 | Kim | F25B 21/02 62/178 |
| 2011/0143000 A1* | 6/2011 | Fiset | A23L 3/28 426/248 |
| 2011/0252813 A1* | 10/2011 | Veltrop | A47J 36/2483 62/3.3 |
| 2011/0252984 A1* | 10/2011 | Chung | G01K 7/01 99/483 |
| 2012/0074121 A1* | 3/2012 | Gagas | A47J 36/2483 219/385 |
| 2012/0103562 A1* | 5/2012 | Alexander | A47J 36/2466 165/64 |
| 2013/0174577 A1* | 7/2013 | Brija | F25B 21/04 62/3.2 |
| 2013/0174578 A1* | 7/2013 | Brija | F25B 21/04 62/3.3 |
| 2013/0200064 A1* | 8/2013 | Alexander | A47G 19/2288 219/441 |
| 2013/0264333 A1* | 10/2013 | Alipour | H05B 6/12 219/621 |
| 2014/0165607 A1* | 6/2014 | Alexander | A47G 19/2288 62/3.3 |
| 2014/0251164 A1* | 9/2014 | Alipour | A47J 27/10 99/483 |
| 2014/0260998 A1* | 9/2014 | Pearson | A47J 27/002 99/288 |
| 2014/0305927 A1* | 10/2014 | Alexander | A47G 19/027 219/387 |
| 2015/0040774 A1* | 2/2015 | Fung | A47J 37/0635 99/337 |
| 2015/0144206 A1* | 5/2015 | Dickinson | B01L 7/02 137/334 |
| 2015/0201803 A1* | 7/2015 | Veltrop | A47J 36/2483 62/3.2 |
| 2015/0245723 A1* | 9/2015 | Alexander | A47G 19/027 99/483 |
| 2016/0018138 A1* | 1/2016 | Liptak | F25B 21/04 62/3.3 |
| 2016/0201018 A1* | 7/2016 | Watson | C12C 13/10 426/11 |
| 2016/0220059 A1* | 8/2016 | Wachtler | A47J 36/32 |
| 2016/0324338 A1* | 11/2016 | Brija | F21V 33/0036 |
| 2017/0356686 A1* | 12/2017 | Xue | A47C 7/624 |
| 2018/0201374 A1* | 7/2018 | Trumper | A47J 39/02 |
| 2018/0235392 A1* | 8/2018 | Yuki | A47G 23/0241 |
| 2019/0144804 A1* | 5/2019 | Hong | C12C 11/00 99/276 |

\* cited by examiner

TEMPERATURE CONTROLLED CONTAINER

CROSS-REFERENCE TO RELATED APPLICATION(S)

Not applicable

BACKGROUND OF THE INVENTION

1. Field of Invention

The present invention relates to the field of food containers and more particularly to containers with controllable temperature settings

2. Description of Related Art

Food service requires certain foods to be served at predetermined temperatures for health concerns or desired temperature presentation. Cooking the food to these temperatures is generally controlled through the use of an intense heating source and a monitoring system such as a thermometer. However, the time between when the food is removed from the heat source until it is presented to the consumer results in a dramatic loss of temperature. Conversely, where food is prepared and intended to be served cold, the temperature can increase based on absorbed heat from its surroundings.

Generally, such changes in temperature are controlled by insulated containers providing for passive temperature support through maintenance of the temperature of the food placed therein. For example, an insulated cooler provides for insulated sides to retain the heat, or lack thereof, of the food placed inside. The cooler can be preemptively conditioned by adding hot water to elevate the initial temperature of the interior of the cooler. Conversely, ice can be added in an attempt to keep food placed therein cold.

These coolers fail to provide active heating or cooling elements that would allow a user to selectively control the temperature. Attempts have been made to provide for more active temperature control aside from the initial cooking element. U.S. patent application Ser. No. 13/287,967 to Clayton Alexander describes Heated or cooled dishwasher safe dishware and drinkware are provided. The dishware and drinkware can be a plate or mug with a dishwasher safe body having a food or beverage receiving portion and a heating or cooling system. The heating or cooling system can have a heating or cooling element that heats or cools the receiving portion of the body. The heating or cooling system can optionally have a power storage element connected to the heating or cooling element, a charging module operatively connected to the power storage element, and/or a wireless power receiver operatively connected to the charging module and configured to transmit power thereto to charge the power storage device. The heating or cooling system is operable to actively heat or cool at least a portion of the body to maintain the solid or liquid food in a heated or cooled state for an extended period of time. However, the capabilities of this example are greatly limited in the ability to provide efficient heating and cooling. The heat loss due to the configuration of the dishware is readily evident, but the configuration is necessary to allow a user to effectively use the dishware.

Traditional chaffers use an open flame to provide a heat source that is distributed throughout the conductive properties of the metal dish, wherein the food is placed. While, the fire is certainly going to heat the container, there is a clear inability to be able to precisely control the amount of heat being transmitted.

Based on the foregoing, there is a need in the art a container that allows for dynamic and selective heating of food placed therein for presentation or long-term temperature maintenance of food placed therein.

SUMMARY OF THE INVENTION

A temperature controlled container comprises an interior defined by a bottom surface and one or more sidewalls extending upward therefrom. A temperature controlling element is configured to adjust a temperature within the interior. A controller is configured to adjust the temperature within the interior.

In an embodiment, the bottom surface is hollow.

In an embodiment, a length of tube is disposed within the hollow bottom surface, wherein a volume of fluid is circulated within the length of tubes, and wherein the volume of fluid transfers heat throughout the container.

In an embodiment, the temperature controlling element is wirelessly connected to a remote device.

In an embodiment, the container further comprises a stand configured to hold the container above a surface, wherein a power source and one or more processors are electrically connected to the temperature controlling element, wherein the one or more processors are configured to selectively adjust the temperature within the container.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
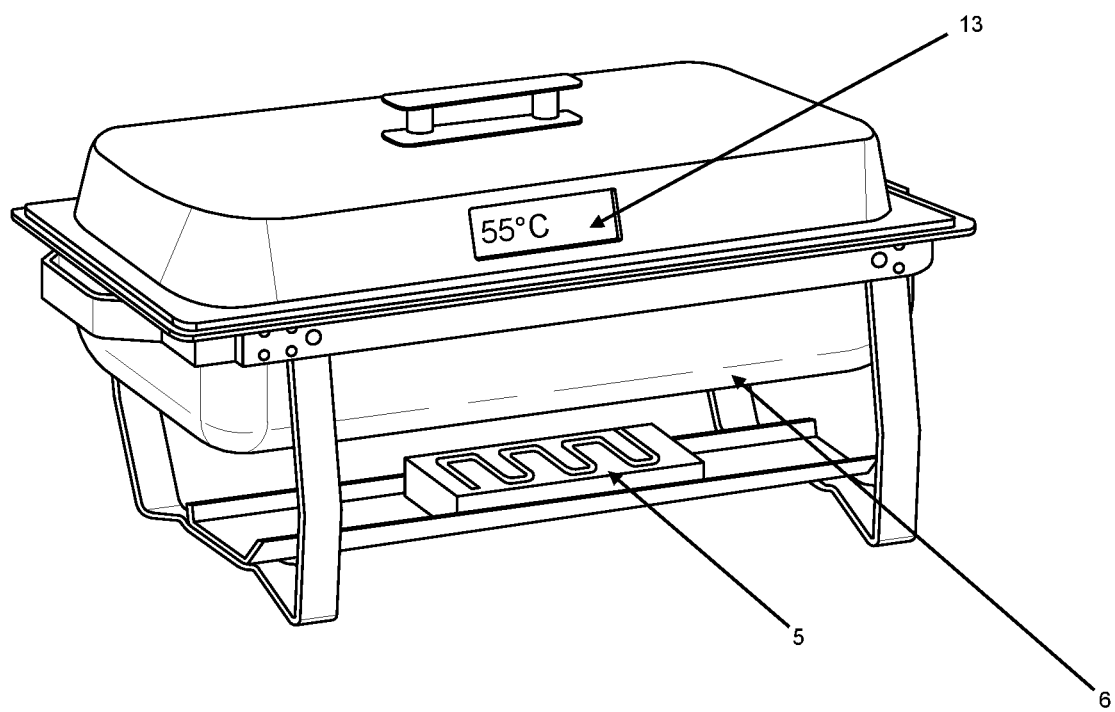
FIG. 1 is a perspective view of the temperature controlled container, according to an embodiment of the present invention.
Figure 2:
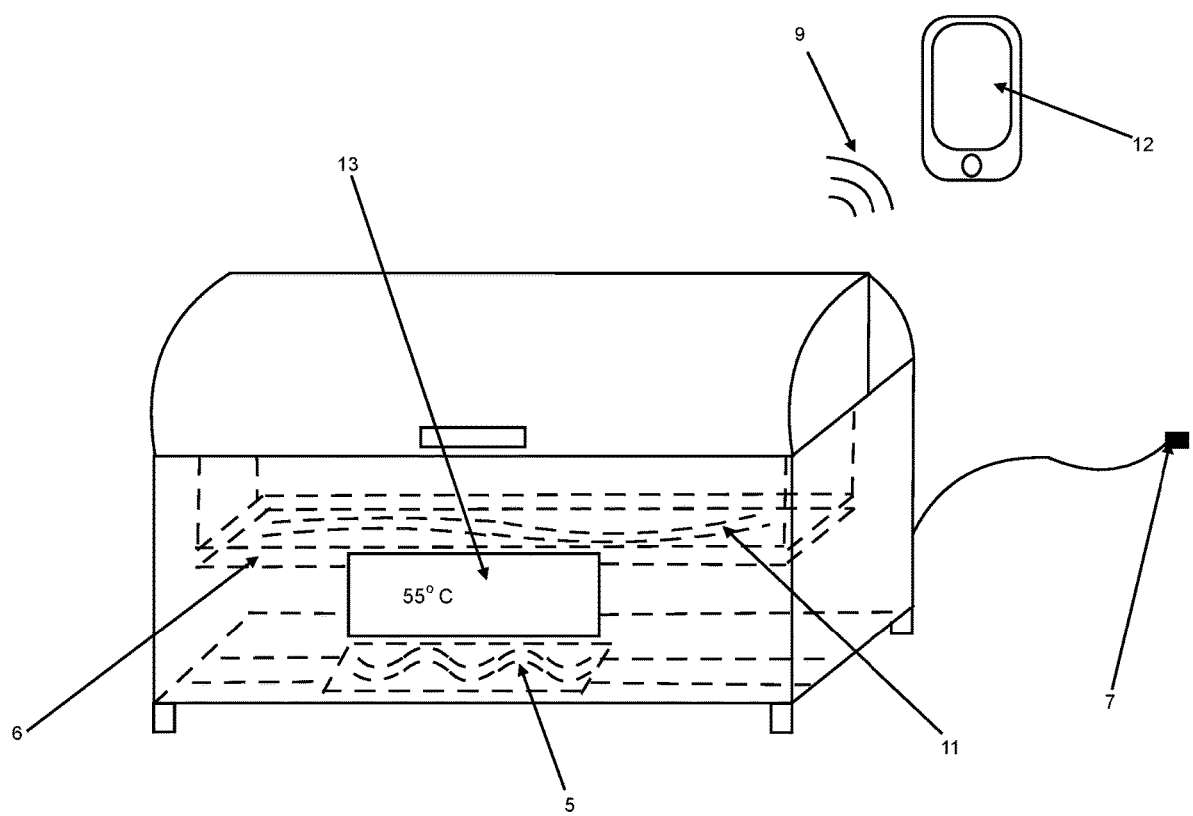
FIG. 2 is a perspective view of the temperature controlled container, according to an embodiment of the present invention.

Preferred embodiments of the present invention and their advantages may be understood by referring to FIGS. 1-2, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

A temperature controlled container has a base with one or more sidewalls extending upward therefrom. The container is comprised of a conductive material configured to transmit temperature increases or decreases throughout the material.

In an embodiment, the container engages a stand. The stand raises the container above a surface. In such an embodiment, the sidewalls have one or more protrusions extending outward from the interior of the container and generally perpendicular to the one or more sidewalls. The protrusions contact an upper perimeter of the stand such that the container is retained in position within an upper portion of the stand above a surface such as a table or counter top. The stand may further provide for traditional heating elements.

In an alternative embodiment, the stand has at least four legs extending downward from the upper portion of the stand to contact the surface. At a bottom portion of the stand, a continuous section of the stand extends between the four legs. The continuous section may provide for an irregular surface to retain heating elements.

In an embodiment, one or more temperature controlling elements 5 are disposed within at least the bottom surface. The bottom surface 6 may be hollow, wherein a hollow interior of the bottom surface is defined by an upper layer, a bottom layer, and the one or more sidewalls. The hollow interior may be configured to house one or more temperature control elements. The temperature control elements are electrically connected to a power source 7. One or more processors are in communication with the temperature control elements and the temperature control elements are wirelessly connected 9 to a controller 10.

In an embodiment, the power source is a battery or element capable of storing a charge to be dispensed at a metered flow. The battery may be interchangeable or removable from the device. The battery may be connected to AC or DC current and is capable to storing a charge to be used in operation of the heating and cooling elements as well as the display or user input elements.

In another embodiment, the container has a plurality of fans disposed within and/or on the container. The fans are configured to control the flow and direction of heated fluids including heated air within and around the container. For example, the fans may be disposed within the bottom surface and circulate the air surrounding the heating elements to disperse the heat throughout the bottom surface. In another example, the fans may be connected to tubing 11 providing for directional adaptability of the flow of air generated by the fans. The tubes may be positioned or adjustable according to efficient flow of air throughout the device.

In an embodiment, the wireless controller provides for a graphical user interface 13 allowing for a plurality of options to selectively control the temperature of one or more sections of the container.

In an embodiment, the container is divided into a plurality of sections allowing for selective control of the temperature across the plurality of sections. For example, a user may engage the graphical user interface to input instructions for a gradient heating from one end of the container to the other. In another embodiment, the container may be separated between a hot surface and a cold surface.

In an embodiment, the container further comprises a pump configured to control the flow of liquids throughout a plurality of tubes disposed within the bottom surface and walls of the container. The fluids are configured to effectively transfer heat or cooling from the fluid to the surfaces of the container. A cooling element with a fan may provide for rapid cooling of the fluid, which is then pumped throughout the system. Conversely, flames or other heating elements may be positioned effectively close to the tubes to transfer heat into the fluid to be transported throughout the system.

In an embodiment, the system wirelessly communicates with a mobile device 12 such as a mobile phone. The mobile phone thereby provides for the graphical user interface allowing for the selective monitoring and control of the temperature of the interior of the container.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A temperature controlled container comprises:
   a. an interior defined by a hollow bottom surface and one or more sidewalls extending upward therefrom, wherein the interior of the container has a plurality of sections, wherein each of the plurality of sections has a different temperature;
   b. a temperature controlling element configured to adjust a temperature within the interior; and
   c. a graphical user interface controller that adjusts one or more temperature controlling elements, wherein at least one of the one or more temperature controlling elements is disposed within the hollow bottom surface.

2. The container of claim 1, further comprising a plurality of fans disposed within the hollow bottom surface.

3. The container of claim 2, wherein a length of tube having a fluid therein is disposed within the hollow bottom surface and wherein the fluid transfers heat throughout the container.

4. The container of claim 1, wherein the temperature controlling element is wirelessly connected to a remote device.

5. The container of claim 3, further comprising a stand configured to hold the container above a surface, wherein a power source and one or more processors are electrically connected to the temperature controlling element, wherein the one or more processors are configured to selectively adjust the temperature within the container.

6. The container of claim 3, wherein air surrounds the length of tube, and wherein at least one of the plurality of fans circulates air within the hollow bottom surface.

7. The container of claim 3, further comprising a cooling element in communication with at least one of the plurality of fans, wherein the cooling element cools the fluid within the length of tube.

8. The container of claim 7, further comprising tubing connected to a fan, wherein the tubing is positioned on the container, wherein the tubing directs a flow of air from the fan within the container.

9. The container of claim 3, wherein the graphical user interface selectively controls the different temperature of each of the plurality of sections.

* * * * *